United States Patent [19]

Arai

[11] Patent Number: 4,666,261

[45] Date of Patent: May 19, 1987

[54] PROJECTION LENS FOR A TELEVISION PROJECTOR

[75] Inventor: Norikazu Arai, Komae, Japan

[73] Assignee: Konishiroku Photo Industry Co., Ltd., Tokyo, Japan

[21] Appl. No.: 724,617

[22] Filed: Apr. 18, 1985

[30] Foreign Application Priority Data

Apr. 18, 1984 [JP] Japan ................................. 59-76578

[51] Int. Cl.$^4$ ........................... G02B 9/34; G02B 13/18
[52] U.S. Cl. ........................................ 350/473; 350/432
[58] Field of Search ................................ 350/473, 432

[56] References Cited

U.S. PATENT DOCUMENTS 4,577,935  3/1986  Yamakawa et al. ................ 350/432
4,603,950  8/1986  Uehara et al. ....................... 350/432

FOREIGN PATENT DOCUMENTS 0593514  10/1947  United Kingdom ................ 350/473

Primary Examiner—John K. Corbin
Assistant Examiner—Rebecca D. Gass
Attorney, Agent, or Firm—Jordan B. Bierman

[57] ABSTRACT

A projection lens in which F is approximately 1.0 to 1.3 used for a 3-tube television projector. The projection lens comprises a first lens of extremely low refractive power, two positive lenses arranged spaced apart from the first lens through a large air space and a negative fourth lens arranged spaced apart therefrom through a large air space, the first lens $L_1$ having at least one surface in the form of an aspherical surface.

It is possible to arrange a reflecting mirror in the large air space to thereby form an optical system into a compact form. In addition, if the second lens $L_2$ and the third lens $L_3$ are made of glass, even if the first lens $L_1$ and the fourth lens $L_4$ are formed into plastic lenses, movement of focal point due to variation in temperature hardly occurs, and a lens of low cost may be obtained.

3 Claims, 8 Drawing Figures

PROJECTION LENS FOR A TELEVISION PROJECTOR

BACKGROUND OF THE INVENTION

1. Field of the Invention

This invention relates to a projection lens for a television projector, and particularly to a projection lens used for a three-tube television projector.

2. Description of the Prior Art

In the television projector, an image plane of a cathode-ray tube (CRT) is enlarged and projected on a screen by a projection lens, but in the three-tube system, image planes of individual CRTs having respective fluorescent bodies of blue, green and red are superposed and projected on a screen by three lenses to obtain a color image. Therefore, a projection lens used therefor need not be achromatized.

Such lens systems composed of plastic lenses have been known from Japanese Patent Application Laid-Open Nos. 124114/80, 34515/82, 108818/82, 177115/82, etc., and large-aperture projection lenses which comprise less number, say three, and whose F number is 1.0 to 1.3 are obtained.

On the other hand, a television projector apparatus is required to have a large screen, but the whole apparatus has to be made smaller for popularization.

Therefore, in an optical system of the projector apparatus, a plane reflecting mirror is arranged between a projection lens and a screen to bend a light path to make the apparatus smaller. It is also proposed to make the apparatus further smaller that an in-mirror lens accommodating therein a plane mirror is used as a projection lens.

Among the aforementioned well known lens systems, there is one that a plane reflecting mirror is inserted between a lens on the side of the screen and an intermediate lens, among three or four lenses, the lens system capable of being used in the state of a large aperture and a wide angle of view. (See, for example, Japanese Patent Application Laid-Open No. 198017/83) However, no arrangement has been found wherein a plane reflecting mirror is inserted between a lens on the side of CRT image plane and an intermediate lens, and wherein a plane reflecting mirror is inserted both between a lens on the side of a screen and an intermediate lens and between an intermediate lens and a lens on the side of CRT image plane, for use.

In Japanese Patent Application Laid-Open No. 174297/83, which comprises three lenses, aberration is well compensated despite large aperture and wide angle of view while providing a large axial air space between the lenses to render the insertion of a reflecting mirror possible but the external diameter and axial thickness of the second lens are extremely large. Therefore, there was a problem in that if the second lens is composed of a plastic lens, a cycle time at the time of molding is extremely long and increases in cost as compared with a spherical glass lens of the same kind. In addition, since a rate of distribution of refractive power of the whole lens to the second lens is great and therefore, introvert comatic aberration remains at a portion where the angle of view is large, which has not always been satisfactory.

SUMMARY OF THE INVENTION

This invention intends to provide a projection lens for a television projector which has a plurality of air spaces capable of inserting a reflecting mirror despite large aperture and wide angle of view, which has a relatively small axial center thickness of each constituting lens and in which both axial aberration and out-of-axial aberration are well compensated.

In accordance with the present invention, a lens for projecting a television image on a screen comprises, in order from the screen, a first lens $L_1$ of small refractive power, a second lens $L_2$ of positive power spaced apart from the first lens through a large air space, a third lens $L_3$ of positive power, and a fourth lens $L_4$ of negative power spaced apart from the third lens through a large air space. At least one surface of the first lens $L_1$ is aspherical, the projecting lens fulfilling $$-0.1 < f/f_1 < 0.1 \tag{1}$$

$$0.5 < f_3/f_2 < 1.5 \tag{2}$$

$$-0.8 < f/n_4 f_4 < -0.4 \tag{3}$$

where
f: focal length of the whole system
$f_i$: focal length of the i lens $L_i$
$n_4$: refractive index of the 4th lens $L_4$ In the figure, G designates to a face plate of CRT.

Among the above-described conditions, the condition (1) is one which provides the distribution of refractive power to the first lens $L_1$. If it exceeds the upper limit and positive refractive power increases, it will be advantageous for compensation of various aberrations but the space between the third lens and the fourth lens has to be shortened to prolong the back-focus. Therefore, if the space between the second lens and the third lens is increased to insert a reflecting mirror therein, it is impossible to have a large aperture and a wide angle of view, thus disabling to use the lens as a projection lens for a television projector. Conversely, if it exceeds the lower limit and negative refractive power increases, the aperture of the second lens and the third lens becomes extremely large, thus disabling to produce a projection lens at low cost.

The condition (2) is concerned with the ratio of refractive power between the second lens $L_2$ and the third lens $L_3$. If it exceeds the upper limit, the refractive power of the second lens increases and therefore, the axial center thickness has to be made large. Conversely, if it exceeds the lower limit, the refractive power of the third lens increases and therefore the axial center thickness of the third lens has to be made large. In either case, it is impossible to produce a projection lens for a television projector at low cost.

The condition (3) is concerned with the refractive power of the fourth lens $L_4$ and is provided to compensate a curve of an image surface. Since an incident height of axial light flux incident upon this lens is small, it is possible to provide a large negative refractive power without affecting on the refractive power and the spherical aberration of the whole system. If it exceeds the upper limit and the negative refractive power increases, the image surface curve is over whereas if it exceeds the lower limit and the negative refractive power decreases, the image surface curve is under.

In large aperture lenses such as a projection lens for a television projector, at least either surface of the first lens $L_1$ has to be formed into an aspherical surface to compensate the spherical aberration of the under. If compensation is made of the spherical surface with the first lens $L_1$ as a spherical lens and with the second lens $L_2$ or the third lens $L_3$ as an aspherical lens, the extrovert comatic aberration becomes large and the angle of view cannot be made large.

As will be apparent from the conditions (1) and (2), the second lens and the third lens share with the greater part of the whole refractive power of the lens. Therefore, if the second lens and the third lens are made of plastic, the focal position is possibly varied due to the change in temperature of the lens environment since temperature dependability of the refractive index of plastic is much greater than that of glass. If this comes into question, the second lens or the third lens or both lenses are made of glass whereby the movement of focus due to variation in environmental temperature may be decreased.

It is further desired that the space $d_6$ between the third lens $L_3$ and the fourth lens $L_4$ is fulfilled with $$f < F \cdot d_6 \quad (4)$$

where F is the F number of lens. If it exceeds the lower limit, shading of light flux increases even if a reflecting mirror is inserted therein and the periphery of the image plane becomes extremely dark as compared with the center thereof.

DETAILED DESCRIPTION OF THE PREFERRED EMBODIMENTS

Figure 1:
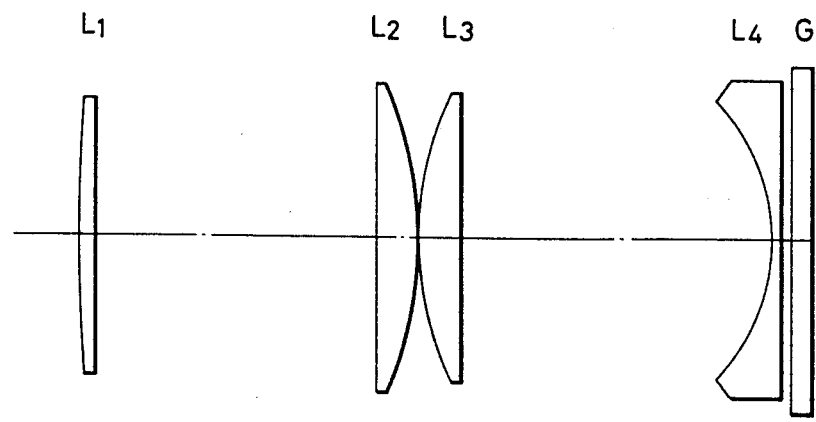
FIG. 1 is a sectional view showing the construction of a projection lens in accordance with the present invention.

In the following, embodiments of the projection lens according to the present invention will be shown. In the tables, reference character $r_i$ designates the radius of curvature of a lens surface of the i lens from the screen side, $d_i$ the space between the lens surfaces of the i lens from the screen side, $n_i$ the refractive index of a lens material of the i lens from the screen side, and $v_i$ the abbe number. In the rectangular coordinate system with the top of the surface made as an original point and with the direction of optical axis made as an X axis, and let C be the curvature of the top, K the conical constant, $A_1$, $A_2$, $A_3$ and $A_4$ be the coefficient of aspherical surface, and $P_1$, $P_2$, $P_3$ and $P_4$ be the number of powers of the aspherical surface, the aspherical contour is given by $$X = \frac{C\phi^2}{1 + \sqrt{1 - (1+k)C^2\phi^2}} + \sum_{i=1}^{4} A_i \phi^{p_i}$$

$$\phi = \sqrt{y^2 + z^2}$$

In the tables, the value of the face plate G is also shown.

Embodiment 1 f = 160.08 Aperture ratio 1:1.25 Magnification −0.14

$f/f_1 = 0.0927$ $f_3/f_2 = 0.717$ $\frac{f}{n_4 f_4} = -0.591$ $F \cdot d_6 = 186.25$

| | ri | di | ni | vi |
|---|---|---|---|---|
| 1 | 850.000 | 7.00 | 1.49200 | |
| 2 | ∞ | 134.00 | | |
| 3 | −2000.000 | 18.00 | 1.51633 | 64.1 |
| 4 | −190.638 | 1.00 | | |
| 5 | 150.533 | 20.00 | 1.51633 | 64.1 |
| 6 | ∞ | 149.00 | | |
| 7 | −92.211 | 4.00 | 1.51633 | 64.1 |
| 8 | ∞ | 4.76 | | |
| 9 G | ∞ | 10.00 | 1.51633 | 64.1 |
| 10 | ∞ | | | |

Coefficient of aspherical surface · number of powers
First surface
K = −8.30067D + 00
A1 = −6.77160D − 08    P1 = 4.0000
A2 = 1.86209D − 12     P2 = 6.0000
A3 = −6.03623D − 16    P3 = 8.0000
A4 = −7.61888D − 21    P4 = 10.0000

Embodiment 2 f = 160.00 Aperture ratio 1:1.25 Magnification −0.14

$f/f_1 = 0$ $f_3/f_2 = 1.288$ $\frac{f}{n_4 f_4} = -0.692$ $F \cdot d_6 = 191.25$

| | ri | di | ni | vi |
|---|---|---|---|---|
| 1 | ∞ | 7.00 | 1.49200 | 58.3 |
| 2 | ∞ | 155.00 | | |
| 3 | 192.441 | 28.00 | 1.51633 | 64.1 |
| 4 | −595.394 | 1.00 | | |
| 5 | 279.615 | 15.00 | 1.49200 | 58.3 |
| 6 | −501.799 | 153.00 | | |
| 7 | −76.225 | 4.00 | 1.49200 | 58.3 |
| 8 | ∞ | 8.19 | | |
| 9 G | ∞ | 10.00 | 1.51633 | 64.1 |
| 10 | ∞ | | | |

Coefficient of aspherical surface · number of powers
Second surface
K = 0.0
A1 = 5.61639D − 08     P1 = 4.0000
A2 = 9.98697D − 13     P2 = 6.0000
A3 = 2.68664D − 17     P3 = 8.0000
A4 = 2.74747D − 22     P4 = 10.0000
Sixth surface
K = −8.77846D − 01
A1 = 3.16279D − 08     P1 = 4.0000
A2 = 8.63810D − 13     P2 = 6.0000
A3 = −4.84206D − 17    P3 = 8.0000
A4 = 1.37543D − 21     P4 = 10.0000
Seventh surface
K = −1.31926D + 00
A1 = −5.74981D − 07    P1 = 4.0000
A2 = 3.91073D − 10     P2 = 6.0000
A3 = −1.26027D − 13    P3 = 8.0000
A4 = 1.32590D − 17     P4 = 10.0000

Embodiment 3 f = 159.97 Aperture ratio 1:1.25 Magnification −0.14

$f/f_1 = -0.0984$ $f_3/f_2 = 0.743$ $\frac{f}{n_4 f_4} = -0.574$ $F \cdot d_6 = 206.25$

| | ri | di | ni | vi |
|---|---|---|---|---|
| 1 | ∞ | 7.00 | 1.49200 | 58.3 |
| 2 | 800.000 | 155.00 | | |
| 3 | 4411.585 | 28.00 | 1.51633 | 64.1 |
| 4 | −206.290 | 1.00 | | |
| 5 | 147.522 | 27.00 | 1.49200 | 58.3 |

4,666,261

-continued

Embodiment 3

| | | | | |
|---|---|---|---|---|
| 6 | −2536.109 | 165.00 | | |
| 7 | −91.828 | 4.00 | 1.49200 | 58.3 |
| 8 | ∞ | 9.97 | | |
| 9 | ∞ | 10.00 | 1.51633 | 64.1 |
| 10 | ∞ | | | |

G [ (brackets spanning rows 9-10)

Coefficient of aspherical surface · number of powers
Second surface
K 1.52483D + 00
A1 = 7.11914D − 08    P1 = 4.0000
A2 = 2.73328D − 12    P2 = 6.0000
A3 = 8.39494D − 17    P3 = 8.0000
A4 = 8.82959D − 22    P4 = 10.0000
Fifth surface
K = −6.59654D − 01
A1 = 1.59387D − 08    P1 = 4.0000
A2 = 6.75411D − 13    P2 = 6.0000
A3 = −2.84273D − 17   P3 = 8.0000
A4 = −7.31435D − 22   P4 = 10.0000
Seventh surface
K = −3.75923D − 01
A1 = −5.18146D − 07   P1 = 4.0000
A2 = 3.92901D − 10    P2 = 6.0000
A3 = −1.26009D − 13   P3 = 8.0000
A4 = 1.32591D − 17    P4 = 10.0000

Embodiment 4 f = 160.00 Aperture ratio 1:1.25 Magnification −0.14

$f/f_1 = 0.0926 \quad f_3/f_2 = 1.372 \quad \frac{f}{n_4 f_4} = -0.671$ $F \cdot d_6 = 186.25$

| | ri | di | ni | vi |
|---|---|---|---|---|
| 1 | 850.000 | 7.00 | 1.49200 | 58.3 |
| 2 | ∞ | 134.00 | | |
| 3 | 173.009 | 20.00 | 1.51633 | 64.1 |
| 4 | −1000.000 | 1.00 | | |
| 5 | 1000.000 | 18.00 | 1.49200 | 58.3 |
| 6 | −239.234 | 149.00 | | |
| 7 | −78.626 | 4.00 | 1.49200 | 58.3 |
| 8 | ∞ | 4.03 | | |
| 9 | ∞ | 10.00 | 1.51633 | 64.1 |
| 10 | ∞ | | | |

G [ (brackets spanning rows 9-10)

Coefficient of aspherical surface · number of powers
First surface
K = −2.30179D + 00
A1 = −5.77403D − 08   P1 = 4.0000
A2 = −5.72068D − 13   P2 = 6.0000
A3 = −2.21779D − 16   P3 = 8.0000
A4 = 6.23715D − 21    P4 = 10.0000
Fifth surface
K = −3.93671D + 00
A1 = −5.36069D − 08   P1 = 4.0000
A2 = −1.88414D − 12   P2 = 6.0000
A3 = 7.85897D − 17    P3 = 8.0000
A4 = −1.29098D − 20   P4 = 10.0000
Seventh surface
K = −9.85658D − 01
A1 = −2.49975D − 07   P1 = 4.0000
A2 = 2.41518D − 11    P2 = 6.0000
A3 = 1.81392D − 16    P3 = 8.0000
A4 = 3.99397D − 23    P4 = 10.0000

Embodiment 5 f = 160.00 Aperture ratio 1:1.25 Magnification −0.14

$f/f_1 = 0 \quad f_3/f_2 = 1.046 \quad \frac{f}{n_4 f_4} = -0.644$ $F \cdot d_6 = 191.25$

| | ri | di | ni | vi |
|---|---|---|---|---|

Embodiment 5

| | | | | |
|---|---|---|---|---|
| 1 | ∞ | 7.00 | 1.49200 | 58.3 |
| 2 | ∞ | 155.00 | | |
| 3 | 203.180 | 28.00 | 1.49200 | 58.3 |
| 4 | −611.281 | 1.00 | | |
| 5 | 258.709 | 18.00 | 1.49200 | 58.3 |
| 6 | −418.782 | 153.00 | | |
| 7 | −81.913 | 4.00 | 1.49200 | 58.3 |
| 8 | ∞ | 7.69 | | |
| 9 | ∞ | 10.00 | 1.51633 | 64.1 |
| 10 | ∞ | | | |

G [ (brackets spanning rows 9-10)

Coefficient of aspherical surface · number of powers
Second surface
K = 0.0
A1 = 5.46269D − 08    P1 = 4.0000
A2 = 1.574820 − 12    P2 = 6.0000
A3 = 3.48511D − 17    P3 = 8.0000
A4 = 3.12891D − 22    P4 = 10.0000
Sixth surface
K = −4.98055D − 01
A1 = 3.43615D − 08    P1 = 4.0000
A2 = 7.36391D − 14    P2 = 6.0000
A3 = 4.02593D − 19    P3 = 8.0000
A4 = −2.85943D − 22   P4 = 10.0000
Seventh surface
K = −1.18278D + 00
A1 = −2.53718D − 07   P1 = 4.0000
A2 = 2.44998D − 11    P2 = 6.0000
A3 = 1.86146D − 16    P3 = 8.0000
A4 = 8.40878D − 23    P4 = 10.0000

Embodiment 6 f = 160.02 Aperture ratio 1:1.25 Magnification −0.14

$f/f_1 = 0 \quad f_2/f_2 = 0.995 \quad \frac{f}{n_4 f_4} = -0.696$ $F \cdot d_6 = 193.75$

| | ri | di | ni | vi |
|---|---|---|---|---|
| 1 | ∞ | 7.00 | 1.49200 | 58.3 |
| 2 | ∞ | 155.00 | | |
| 3 | 572.281 | 23.00 | 1.51633 | 64.1 |
| 4 | −241.773 | 1.00 | | |
| 5 | 157.916 | 23.00 | 1.51633 | 64.1 |
| 6 | 1974.572 | 155.00 | | |
| 7 | −75.786 | 4.00 | 1.49200 | 58.3 |
| 8 | ∞ | 6.77 | | |
| 9 | ∞ | 10.00 | 1.51633 | 64.1 |
| 10 | ∞ | | | |

G [ (brackets spanning rows 9-10)

Coefficient of aspherical surface · number of powers
Second surface
K = 0.0
A1 = 5.74637D − 08    P1 = 4.000
A2 = 2.45786D − 12    P2 = 6.0000
A3 = 8.23960D − 17    P3 = 8.0000
A4 = 8.97228D − 22    P4 = 10.0000
Seventh surface
K = −1.18107D + 00
A1 = −5.19915D − 07   P1 = 4.0000
A2 = 3.92757D − 10    P2 = 6.0000
A3 = −1.26009D − 13   P3 = 8.0000
A4 = 1.32592D − 17    P4 = 10.0000

Embodiment 7 f = 160.02 Aperture ratio 1:1.25 Magnification −0.14

$f/f_1 = 0.0926 \quad f_3/f_2 = 0.957 \quad \frac{f}{n_4 f_4} = -0.560$ $F \cdot d_6 = 186.25$

| | ri | di | ni | vi |
|---|---|---|---|---|
| 1 | 850.000 | 7.00 | 1.49200 | 58.3 |

-continued

Embodiment 7

| | | | | |
|---|---|---|---|---|
| 2 | ∞ | 134.00 | | |
| 3 | 4816.977 | 18.00 | 1.51633 | 64.1 |
| 4 | −186.937 | 1.00 | | |
| 5 | 150.782 | 20.00 | 1.51633 | 64.1 |
| 6 | 1149.002 | 149.00 | | |
| 7 | −97.338 | 4.00 | 1.51633 | 64.1 |
| 8 | ∞ | 3.71 | | |
| 9 | ∞ | 10.00 | 1.51633 | 64.1 |
| 10 | ∞ | | | | with G bracketing rows 9 and 10.

Figure 2:
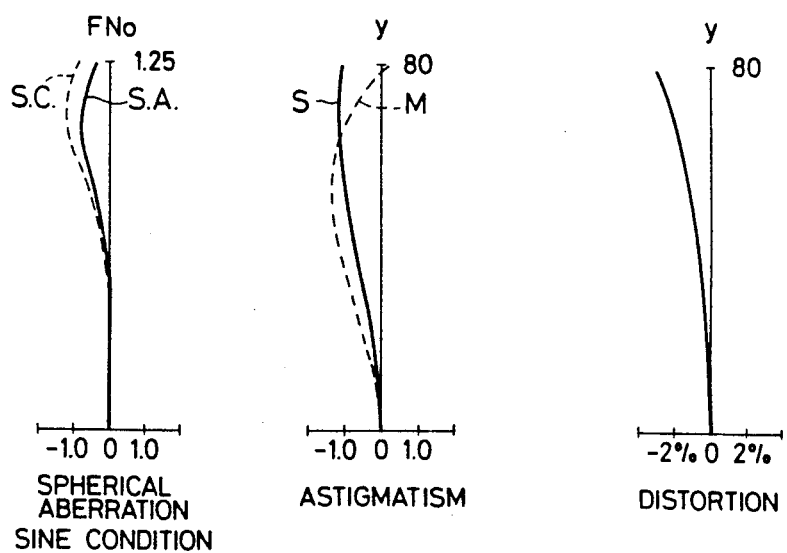
FIGS. 2 to 8 show aberrations in first to seventh embodiments, respectively.
Figure 3:
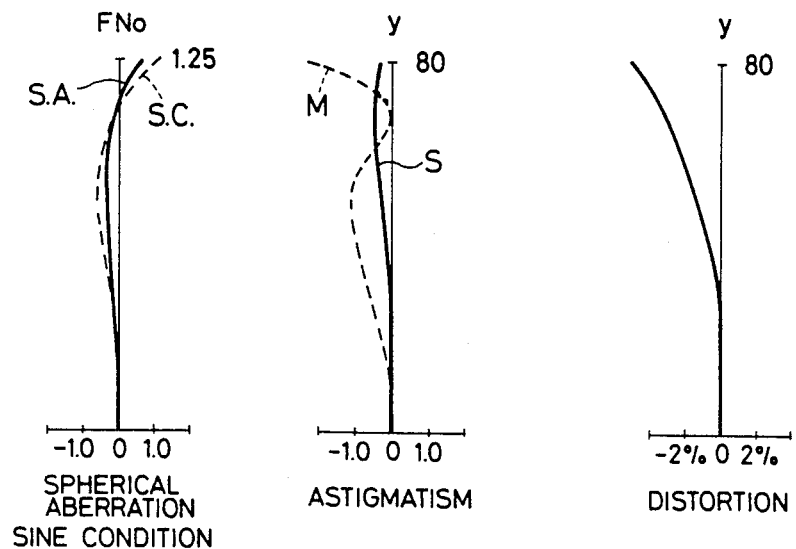
Figure 4:
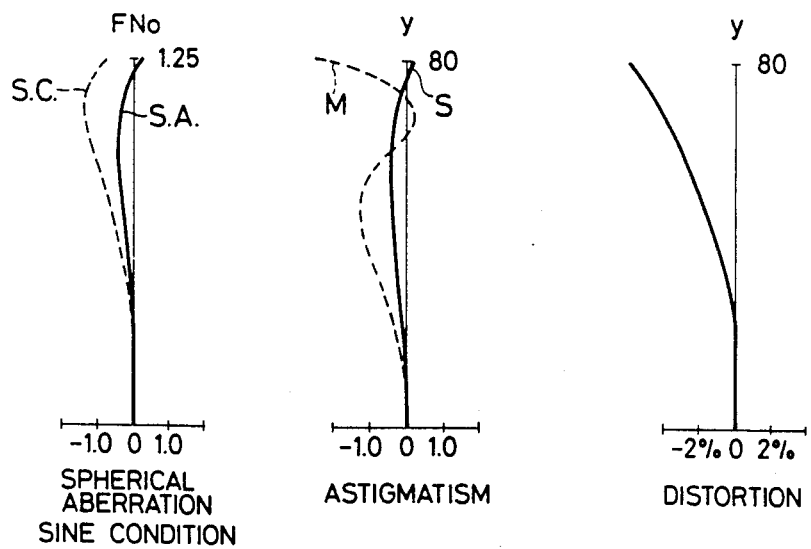
Figure 5:
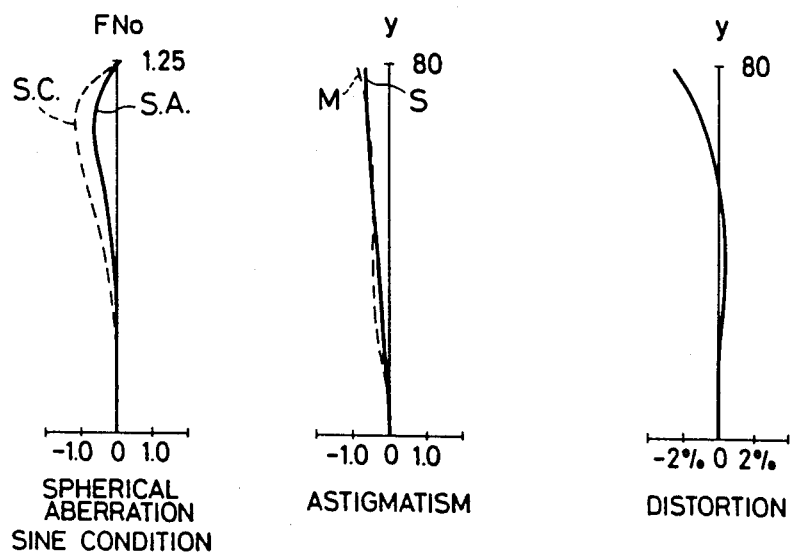
Figure 6:
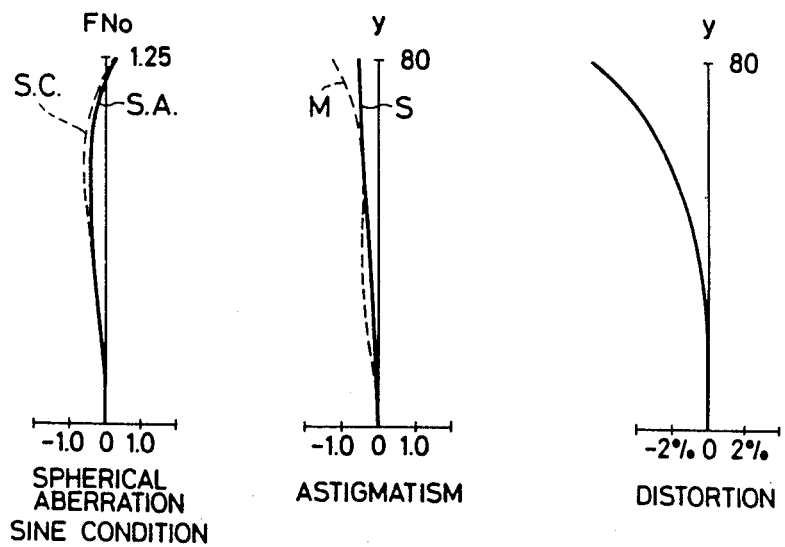
Figure 7:
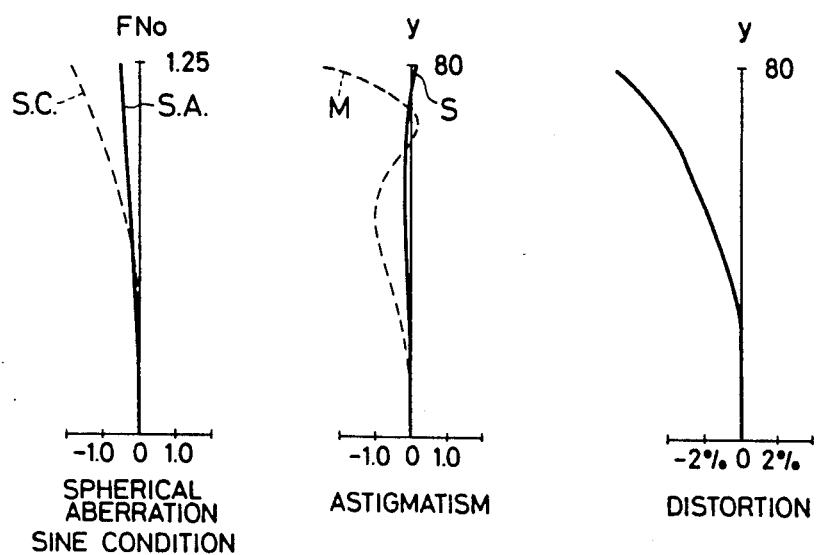
Figure 8:
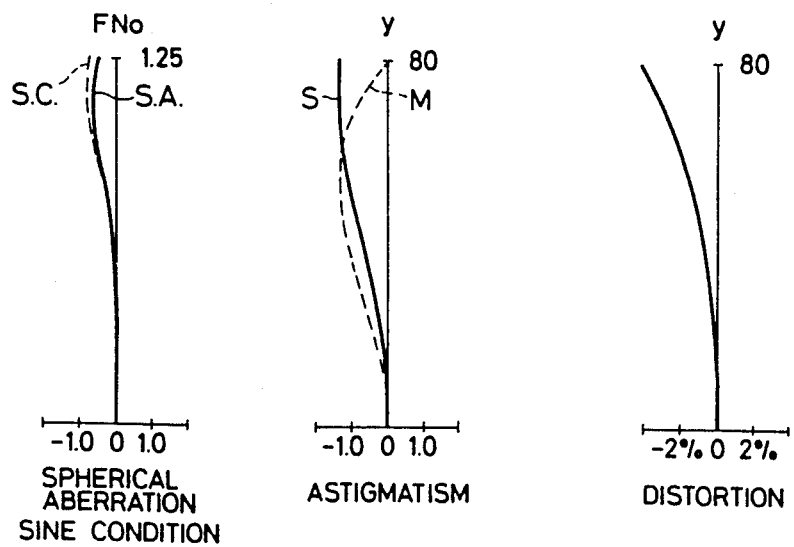

Coefficient of aspherical surface · number of powers
First surface
$K = -6.93688D + 00$
$A_1 = -6.62619D - 08 \quad P_1 = 4.0000$
$A_2 = 1.74887D - 13 \quad P_2 = 6.0000$
$A_3 = -3.97320D - 16 \quad P_3 = 8.0000$
$A_4 = -4.99909D - 21 \quad P_4 = 10.0000$ The projection lens according to this invention has the above-described construction and as will be apparent from the embodiments, the axial center thickness of each of constituting lenses is relatively small and there are a plurality of air spaces into which a reflecting mirror or the like may be inserted. The aberrations are compensated over the range of the large aperature and large angle of view as shown in the aberrations of FIGS. 2 to 8 despite the aforementioned limitation, and the lens of the present invention has a sufficient performance as the projection lens for a television projector.

In the figures, a reference character S.A. designates the spherical aberration, S.C. the sine condition, S the sagittal image surface, M the meridional image surface, and y the height of image.

If the second lens or the third lens or both the lenses comprise a glass lens, movement of focal point due to variation in environmental temperature can be decreased. In this case, rise of cost may be restrained by using a glass lens in place of a spherical lens used in the embodiments.

Where the movement of focal point due to variation in environmental temperature does not come into problem, it would be advantageous that both the second lens and third lens comprise a plastic lens but since these lenses have a small axial thickness, it becomes possible to provide a considerable reduction in cycle time at the time of molding. In addition, a small molding machine can be used, and even from this viewpoint, cost can be reduced.

What is claimed is:

1. A lens for projecting a television image na screen comprising, in order from said screen, a first lens $L_1$ of small refractive power, a second lens $L_2$ of positive power spaced apart from the first lens through a large air space, a third lens $L_3$ of positive power and a fourth lens $L_4$ of negative power spaced apart from the third lens through a large air space, a side of a, at least one surface of the first lens $L_1$ being in the form of as aspherical surface, said lens for projecting fulfilling the following conditions:

$$-0.1 < f/f_1 < 0.1$$

$$0.5 < f_3/f_2 < 1.5$$

$$-0.8 < f/n_4 f_4 < -0.4$$

where
f: focal length of the whole system
fi: focal length of the i lens $L_i$
n4: refractive index of the 4th lens $L_4$ 2. The lens according to claim 1, wherein the second lens $L_2$ and the third lens $L_3$ comprise a glass lens, and the first lens $L_1$ and the fourth lens $L_4$ comprise a plastic lens.

3. The projection lens according to claim 1, wherein the space $d_6$ between the third lens $L_3$ and the fourth lens $L_4$ fulfilled fulfills the following:

$$f < F \cdot d_6$$

where F is F number of lens.

* * * * *